(12) United States Patent
Malm

(10) Patent No.: US 11,142,722 B2
(45) Date of Patent: Oct. 12, 2021

(54) PURIFICATION OF FEEDSTOCK BY HEAT TREATMENT

(71) Applicant: Neste Oyj, Espoo (FI)

(72) Inventor: Annika Malm, Porvoo (FI)

(73) Assignee: NESTE OYJ, Espoo (FI)

( * ) Notice: Subject to any disclaimer, the term of this patent is extended or adjusted under 35 U.S.C. 154(b) by 13 days.

(21) Appl. No.: 16/322,835

(22) PCT Filed: Aug. 1, 2017

(86) PCT No.: PCT/EP2017/069438
§ 371 (c)(1),
(2) Date: Feb. 1, 2019

(87) PCT Pub. No.: WO2018/024728
PCT Pub. Date: Feb. 8, 2018

(65) Prior Publication Data
US 2019/0203154 A1 Jul. 4, 2019

(30) Foreign Application Priority Data

Aug. 5, 2016 (FI) ...................................... 20165606

(51) Int. Cl.
*C11B 3/04* (2006.01)
*C11B 3/00* (2006.01)

(52) U.S. Cl.
CPC .................. *C11B 3/04* (2013.01); *C11B 3/00* (2013.01); *C11B 3/001* (2013.01)

(58) Field of Classification Search
CPC .............. C11B 3/04; C11B 3/00; C11B 3/001
See application file for complete search history.

(56) References Cited

U.S. PATENT DOCUMENTS

| | | | |
|---|---|---|---|
| 2,410,926 A | * | 11/1946 | Bush ...................... C11B 3/001 554/184 |
| 3,082,167 A | | 3/1963 | Erdman |
| 3,459,658 A | | 8/1969 | Langlois et al. |
| 3,817,384 A | | 6/1974 | Tanaka et al. |
| 4,049,686 A | * | 9/1977 | Ringers .................... C11B 3/04 554/204 |
| 4,280,962 A | | 7/1981 | Watanabe et al. |
| 4,411,774 A | | 10/1983 | Johnson |
| 5,053,169 A | | 10/1991 | Price |
| 5,315,021 A | | 5/1994 | Beharry et al. |
| 5,516,924 A | * | 5/1996 | van de Sande .......... C11B 3/02 554/192 |

(Continued)

FOREIGN PATENT DOCUMENTS

| | | |
|---|---|---|
| CN | 1982412 A | 6/2007 |
| CN | 103571630 A | 2/2014 |

(Continued)

OTHER PUBLICATIONS

Finnish Search Report for FI 20165606 dated Dec. 2, 2016 (2 pages).

(Continued)

*Primary Examiner* — Nicholas E Hill
(74) *Attorney, Agent, or Firm* — Buchanan Ingersoll & Rooney PC

(57) ABSTRACT

Present invention relates to a novel process for purification of feedstock for further use as a source of fuel or chemicals.

18 Claims, 3 Drawing Sheets

(56) References Cited

U.S. PATENT DOCUMENTS

| | | | |
|---|---|---|---|
| 6,024,481 A * | 2/2000 | Hillstrom | B01F 3/0853 366/155.1 |
| 8,017,819 B2 | 9/2011 | Yao et al. | |
| 2006/0110521 A1 * | 5/2006 | Heise | C11B 3/14 426/601 |
| 2010/0059450 A1 | 3/2010 | Lafosse et al. | |
| 2010/0286420 A1 * | 11/2010 | Akatsuka | B01J 37/08 554/163 |
| 2011/0047866 A1 | 3/2011 | Bao et al. | |
| 2012/0110898 A1 | 5/2012 | Malm et al. | |
| 2012/0116103 A1 | 5/2012 | Hujanen et al. | |
| 2012/0190872 A1 | 7/2012 | Cranford et al. | |
| 2013/0197251 A1 | 8/2013 | Kumar et al. | |
| 2014/0018559 A1 * | 1/2014 | Nagy | C11B 3/10 554/21 |
| 2014/0020282 A1 * | 1/2014 | Lavella, Sr. | C10L 1/026 44/307 |
| 2016/0002566 A1 * | 1/2016 | Vanhercke | C10G 3/40 435/134 |
| 2016/0145536 A1 * | 5/2016 | Slade | C11C 3/003 554/174 |

FOREIGN PATENT DOCUMENTS

| | | |
|---|---|---|
| CN | 103805336 A | 5/2014 |
| EP | 0172884 B1 | 9/1990 |
| EP | 2450426 A1 | 5/2012 |
| WO | 2009131510 A1 | 10/2009 |

OTHER PUBLICATIONS

International Search Report (PCT/ISA/210) dated Sep. 20, 2017, by the European Patent Office as the International Searching Authority for International Application No. PCT/EP2017/069438.
Written Opinion (PCT/ISA/237) dated Sep. 20, 2017, by the European Patent Office as the International Searching Authority for International Application No. PCT/EP2017/069438.
Office Action dated Oct. 31, 2019, by the Indian Patent Office in corresponding Indian Patent Application No. 201917002346. (6 pages).
Office Action dated May 13, 2020, by the Korean Patent Office in corresponding Korean Patent Application No. 10-2019-7002675, and an English Translation of the Office Action. (19 pages).

* cited by examiner

PURIFICATION OF FEEDSTOCK BY HEAT TREATMENT

TECHNICAL FIELD

Present invention relates to methods for purification of feedstock wherein the purified feedstock has the appropriate quality to be further used as a source of fuel or chemicals. In particular, the invention relates to methods for purifying feedstock that is conventionally seen as containing levels of impurities too high to be commercially profitable to use in a purification process to obtain a purified feedstock of a quality allowing the use thereof as a source of fuel or chemicals. The impurities may be of a character that conventional methods are not able to remove from the feedstock to such a degree that is prescribed as the appropriate quality for further use as a source of fuel or chemicals.

BACKGROUND ART

A pre-treatment process in which triglyceridic material is heated in a temperature ranging from 100-540° C., preferably 200-400° C. is presented in publication U.S. Pat. No. 8,017,819. This heating can be performed with or without addition of hydrocarbons and/or a co-feed gas, such as hydrogen, nitrogen, carbon monoxide or carbon dioxide.

WO2009131510 relates to a conversion of crude tall oil (CTO) to renewable diesel fuels in high yield suitable for direct use in engines or for final treatment by hydrogen to make low sulphur diesel range automotive fuel compositions. In the method CTO stream (from pulp mills) is initially subjected to at least one reaction/purification step selected from acid wash, heterogeneous mono- and/or polyfunctional system and filtration/centrifugation to obtain refined tall oil with lignin/fibres content below about 100 ppm and calcium content below about 10 ppm. Suitable acids for this application are sulfuric and phosphoric acids due to their strong affinity towards calcium. The washing acids can be applied from concentrated form to highly diluted acid solution. However, acids diluted with water are reported as preferred in order to avoid carbonization of the organic material.

CN103805336 discloses a high-efficient rice bran oil degumming method. According to this method crude oil is heated (temperature is not disclosed); phosphoric acid with a concentration of 85% is added so as to promote conversion of nonhydratable phospholipids in crude oil to hydratable phospholipids; a small amount of diluted alkali is added so as to realize hydration and flocculation of phospholipids in liquid crystal states via alkali neutralization of free fatty acids; dehydrated rice bran oil is delivered into a blade filter for one time of filtration and blow-drying without vibrating filter cake; impurities such as residual phospholipids and metal ions are removed via filtration using decolored waste white clay, colloids in the rice bran oil are removed completely via a plurality of times of separation, and subsequent technique implementation quality is ensured.

EP172884 illustrates in an example of a pre-treatment before catalytic hydrogenation and decarboxylation/hydrodeoxygenation, wherein soybean oil was washed with 40% phosphoric acid.

SUMMARY OF THE INVENTION

Present invention relates to a process for purifying a feedstock, the process comprising the steps of;
a) providing a feedstock,
b) adding to the feedstock a substance capable of forming a separate phase with the impurities present in the feedstock,
c) heating the admixture b),
d) optionally removing water,
e) removing the separated phase from the heat treated feedstock to obtain a purified feedstock.

In present invention the term "feedstock" should be understood as meaning any material that may be used as a source of fuel once it has undergone the purification process according to present invention. Non-limiting examples of feedstock is e.g. that the feedstock may be of fossil or non-fossil origin. Feedstock may thus denote tall oil pitch or the residual bottom fraction from tall oil distillation processes, animal based oils or fats, fish based oils or fats, vegetable based oils or fats such as e.g. sludge palm oil and used cooking oil or oil used in deep frying, microbial or algae oils, free fatty acids, used or spent lubrication oils, or lipids containing phosphorous and/or metals. Other examples of feedstock are plant oils, plant fats, animal fats and animal oils, and mould oils. Suitable feedstock include also rapeseed oil, canola oil, colza oil, tall oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria.

In one embodiment the feedstock e.g. of fossil or non-fossil origin selected from fats, waxes or oils or any mixtures thereof, comprising one or more of tall oil pitch or the residual bottom fraction from tall oil distillation processes, animal based oils or fats, vegetable or plant based oils or fats, sludge palm oil or used cooking oil, microbial or algae oils, free fatty acids, or any lipids containing phosphorous and/or metals, oils originating from yeast or mould products, oils originating from biomass, rapeseed oil, canola oil, colza oil, tall oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria or any mixtures of said feedstocks.

It is to be understood that feedstock may be a mixture of any of the above mentioned examples of feedstock. The impurities present in the feedstock may be of various character or origin. Specifically, the impurities are such that they may be harmful in the process, e.g. they may poison or deactivate catalysts used in any further processing of the feedstock following the process of present invention. The impurities may be of metallic origin such as elementary metals or for example phosphorous compounds.

In present invention the term "substance" capable of forming a separate phase means any substance that is able to form a compound or react with the impurities such that the formed compound or reaction product forms a separate phase which may be separated from the purified feedstock. The separate phase may be a gel, precipitate or a liquid phase that is immiscible with the purified feedstock, allowing it to be separated from the feedstock. Examples of substances may be one or more acids or one or more chelating compounds or any mixtures thereof.

Removal of the separate phase may take place by any method suitable for the specific application. Such methods are, but not limited to, filtration, phase-phase separation, centrifugation or decantation. The separation may also take place by use of several different types of separation techniques.

The term "heated" means that the feedstock and the substance capable of forming a separate phase is heated above normal room temperature and held at the desired elevated temperature for a stipulated time.

DETAILED DESCRIPTION

Figure 1:
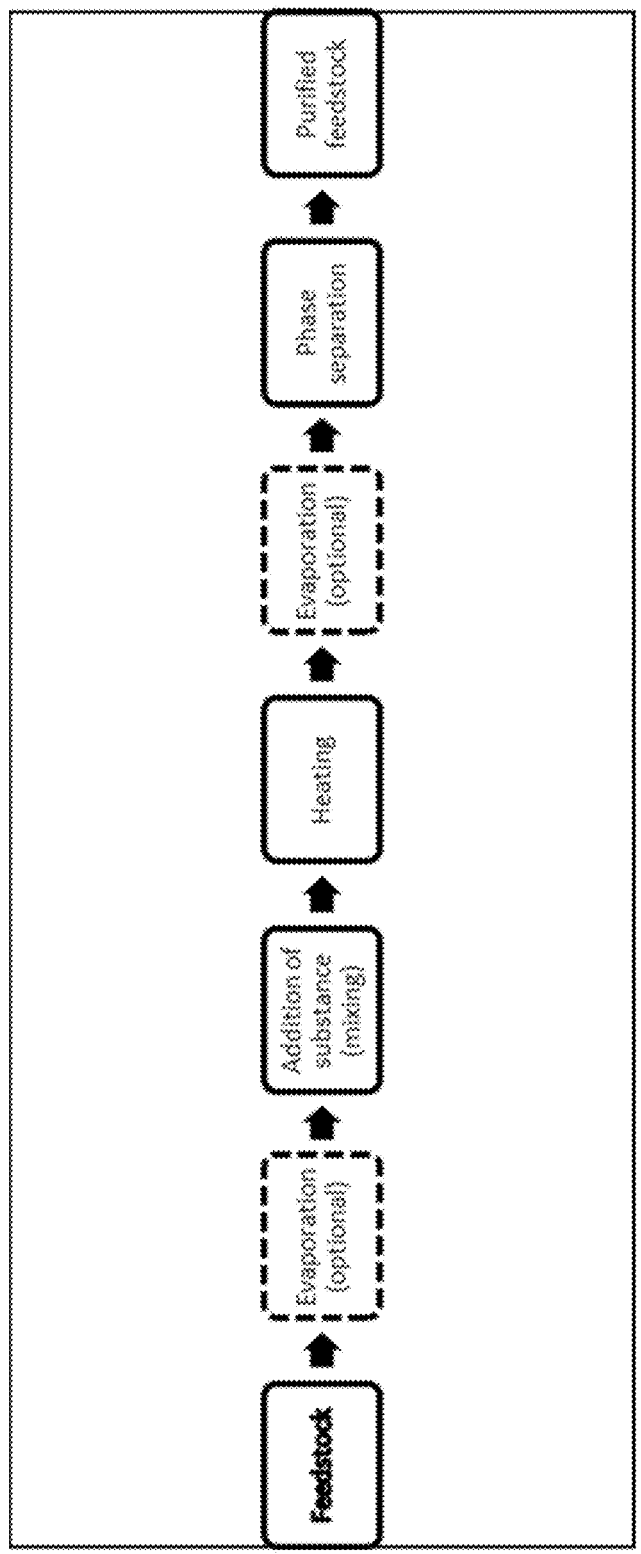
FIG. 1 illustrates a flow chart of the process of present invention.

Present invention relates to a process for purifying a feedstock. Specifically, the invention relates to a process for purifying a feedstock, the process comprising the steps of;
  a) providing a feedstock,
  b) adding to the feedstock a substance capable of forming a separate phase with the impurities present in the feedstock,
  c) heating the admixture b),
  d) optionally removing water,
  e) removing the separated phase from the heat treated feedstock
    to obtain a purified feedstock.

Present invention also relates to a process for purifying a feedstock, the process comprising the steps of;
  a) providing a feedstock,
  b) adding to the feedstock phosphoric acid or sulphuric acid forming a separate phase with impurities present in the feedstock,
    i) optionally, adjusting the water content of the feedstock in step b),
  c) heating the admixture b) to a temperature of 200° C. to 280° C.,
  d) optionally removing water,
  e) removing the separated phase from the heat treated feedstock
    to obtain a purified feedstock.

In one aspect of the invention, water is adjusted in step i) such that the amount of water is e.g. about 0.05 wt % to about 10 wt %, such as e.g. about 0.1 wt % to about 5 wt %, such as e.g. about 0.05%, about 0.2 wt %, or about 0.5 wt %, about 3 wt %, about 4 wt %, about 5 wt %, about 6 wt %, about 7 wt %, about 8 wt %, about 9 wt %, or about 10 wt % to weight of the mixture capable of forming a separate phase with the impurities present in the feedstock.

As mentioned above the feedstock to be used in present invention is a feedstock to be purified into a material that may serve as a source for fuel of any kind. The important factor is that the purified feedstock has to be of such a quality that it can serve as a fuel or be used in further processes such as e.g. catalytic cracking without containing levels of impurities that may e.g. jeopardize the full functionality of an engine or poisoning of catalysts or otherwise hampering of any further processes that the purified feedstock may be subjected to. Such further processes may be e.g. catalytic cracking, thermo-catalytic cracking, catalytic hydrotreatment, fluid catalytic cracking, catalytic ketonization, catalytic esterification, or catalytic dehydration. The purified feedstock may also be further processed into various chemicals, such as bulk chemicals (e.g. polymers, solvents, solvent components and lubricants) or specialty chemicals (e.g. cosmetics and pharmaceuticals).

In the art, there are various methods for purification of feedstock for the purposes mentioned herein. However, feedstock that contains high level of impurities may not be able or feasible to be purified by techniques known in the art such that the purified feedstock contains low levels of impurities allowing it to be used as a source of fuel. Present invention solves this problem by the method as disclosed herein, thereby allowing use of a feedstock that would normally be seen as uneconomical or unsuitable for purification.

Feedstock according to the invention may be, but is not limited to, any lipids containing phosphorous and/or metals. Examples are tall oil pitch or the residual bottom fraction from tall oil distillation processes, animal based oils or fats, vegetable based oils or fats such as e.g. sludge palm oil and used cooking oil or oil used in deep frying, microbial or algae oils, free fatty acids, used or spent lubrication oils or other types of waxes. Other examples of feedstock are plant oils, plant fats, animal fats and animal oils, algae, yeast and mould oils. It is to be understood that feedstock may be a mixture of any of the above mentioned examples of feedstock. Suitable biological raw materials include rapeseed oil, canola oil, colza oil, tall oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria.

Exemplified feedstock include, but is not limited to:
  Tall oil pitch (TOP), residual bottom fraction from tall oil distillation process,
  Low quality animal fat (AF), not accepted to catalytic hydrotreatment process (very high N, PE, metals, phosphorus contents),
  Sludge palm oil (SPO) with very high iron content. SPOs are waste oils collected from water ponds located near palm oil mills,
  Used cooking oil (UCO), may contain high level of oligomers and chlorides These feeds need to be purified in order to lower the level of elements known to act as catalyst poison Feedstock to be purified may contain impurities containing metals and phosphorus in the form of phospholipids, soaps or salts. Traditional techniques to remove impurities from lipids or fats consist of degumming and bleaching. In degumming impurities are removed by addition of acid and water and the separation of impurities is performed by gravitational separation by e.g. centrifugation. This process may become impossible due to high amount of emulsifying compounds (such as phospholipids, hydrolysed lipids), high density or viscosity of the feedstock. These result in poor phase separation and high losses of feedstock.

In bleaching process adsorbents with limited adsorbent capacity are used and high impurity feedstock generally become uneconomical to purify.

Present invention has the benefit of the possibility to use filtration to separate the impurities in the separate phase, thus minimising the entrained feedstock and minimising losses.

Substances capable of forming a separate phase with the impurities present in the feedstock, may be e.g. an acid or a chelating compound capable of forming one or more compounds with the impurities present in the feedstock, such that the formed one or more compounds forms a separate phase which is separable from the purified feedstock.

In such instance the substance capable of forming a separate phase with the impurities present in the feedstock is an acid, the acid is a non-oxoacid or mixture of non-oxoacids, an inorganic oxoacids or a mixture of inorganic oxoacids.

Suitable acids may be e.g. phosphoric acid or acids related thereto. Another example is sulphuric acid or acids related thereto.

Thus the acid may be one or more of phosphoric acid, polyphosphoric acid, metaphosphoric acid, pyrophosphoric acid, peroxomonophosphoric acid, hypophosphoric acid, diphosphoric acid, phosphonic acid, diphosphonic acid, phosphinic acid, sulfuric acid, sulphurous acid, disulfuric acid, peroxomonosulfuric acid, peroxodisulfuric acid, thiosulfuric acid, dithionic acid, disulfurous acid, thiosulfurous acid, dithionous acid, sulfoxylic acid, polythionic acids or any mixtures thereof.

Specifically the acid may be one or more of phosphoric acid, polyphosphoric acid, metaphosphoric acid, pyrophosphoric acid, peroxomonophosphoric acid, hypophosphoric acid, diphosphoric acid, phosphonic acid, diphosphonic acid, phosphinic acid.

Preferably the acid is phosphoric acid.

Furthermore, the acid may be one or more of sulfuric acid, sulphurous acid, disulfuric acid, peroxomonosulfuric acid, peroxodisulfuric acid, thiosulfuric acid, dithionic acid, disulfurous acid, thiosulfurous acid, dithionous acid, sulfoxylic acid, polythionic acids.

Preferably the acid is sulfuric acid.

With respect to acids, the acids used in the process should preferably contain as little water as possible. Consequently, the acids are in concentrated form. With respect to e.g. phosphoric acid the concentration is usually around 85 vol. % or higher. With respect to e.g. sulfuric acid the concentration is about 98 vol. % or higher. However, the concentration may be from about 50 vol. % to about 100 vol. %, such as e.g. about 95 vol. % to about 98 vol. %, such as about 85 vol. %, such as about 99 vol %. In this respect a person skilled in the art will know that the term concentrated acid refers to the maximum attainable concentration of the acid in question in an aqueous solution.

The substances capable of forming a separate phase with the impurities present in the feedstock may be one or more chelating compound, wherein the chelating compound forms a chelate with the impurities. The chelator or a mixture of chelators is selected from DTPA (diethylenetriaminepentaacetic acid), EDTA (ethylenediaminetetraacetic acid), NTA (nitrilotriacetic acid) or any mixtures thereof.

Metal impurities that may be present in the feedstock may be e.g. alkali metals or alkali earth metals, such as sodium or potassium salts or magnesium or calcium salts or any compounds of said metals. The impurities may also be in form of phosphates or sulphates, iron salts or organic salts, soaps or e.g. phospholipids The amount of substance capable of forming a separate phase with the impurities present in the feedstock that is added to the feedstock is e.g. about 50 ppm to about 100000 ppm, such as e.g. 500 ppm to about 10000 ppm, such as e.g. about 500 ppm to about 4000 ppm, such as e.g. about 1000 ppm to about 5000 ppm, such as e.g. about 2000 ppm to about 4000 ppm, such as e.g. about 50 ppm, about 100 ppm, about 500 ppm, about 1000 ppm, about 2000 ppm, about 3000 ppm, about 4000 ppm, about 5000 ppm, about 6000 ppm, about 7000 ppm, about 8000 ppm, 9000 ppm or about 10000 ppm.

Optionally, a certain amount of water may be added to the mixture of the substance capable of forming a separate phase with the impurities present in the feedstock and the feedstock in step b). The amount of water may be about 0.05 wt % to about 10 wt %, such as e.g. about 0.1 wt % to about 5 wt %, such as e.g. about 0.2 wt %, about 0.5 wt %, about 13 wt % or about 4 wt % to weight of the mixture capable of forming a separate phase with the impurities present in the feedstock.

According to the invention, the process of purification takes place under heating. In the above described process the heating takes place in step c). The mixture is thus heated to the desired temperature and held at the desired temperature for a certain period of time. The heating temperature in step c) is about 150° C. to about 350° C., such as e.g. about 200° C. to about 280° C., such as e.g. about 200° C., about 230° C., about 260° C., about 280° C. or about 290° C.

The time during which the mixture is heated and held at the desired temperature is about 1 minute to about 420 minutes, such as e.g. about 10 minutes to about 180 minutes, such as e.g. about 5 minutes to about 60 minutes, such as e.g. about 10 minutes to about 60 minutes, such as about 20 minutes, about 30 minutes, about 40 minutes, about 50 minutes or about 60 minutes, or about 5 minutes, about 10 minutes, about 20 minutes, about 30 minutes, about 40 minutes, about 50 minutes, about 60 minutes, about 90 minutes or about 180 minutes.

Ideally the time during which the desired temperature is held is about 5 minutes to about 60 minutes.

Enough contact between the added substance and feedstock should be enabled by any suitable method, by e.g. mixing before or during heating the mixture. Mixing can be done e.g. by stirring. Stirring may be achieved by conventional means such as e.g. mechanical stirring. Stirring may be done at e.g. about 100 rpm, or about 300 rpm, or about 500 rpm, or about 1000 rpm.

After the heating process in step c) any water present in the mixture may optionally be removed. Removal of water may alleviate the separation of the phases of the mixture. This could be the case when using precoat materials in filtration that may get clogged by excess water. Removal of the water may take place in step d) in the process according to the invention. Removal may take place by any suitable technique which may be e.g. flash evaporation or any suitable vapour-liquid separation or removal by physical separation wherein the water layer is separated from the rest of the mixture. Thus water may optionally be removed before removal of any other components as seen in step e) in the process according to the invention.

According to the process of present invention, step a) may optionally be preceded by a step wherein any water present may be removed by any of the techniques discussed herein.

Water content of mixture may be limited due to equipment restrictions: higher water content leads to higher pressure tolerance of the equipment. Thus it may be economical to limit the water content of feedstock or added substance. Feedstock may therefore be dried before step a). For example sludge palm oil or pyrolysis oil may contain such high levels of water.

The compounds formed by either reaction with the substance capable of forming a separate phase with the impurities present in the feedstock or chelation thereof, may be removed by any suitable technique in step e). Such technique may be e.g. filtration, settling, centrifugation, bleaching, degumming, water washing or gravitational sedimentation or any combination thereof.

Depending on the aimed catalytic process there is specific target purification level of feedstock that should be gained in feedstock purification. The level of impurities (metals, P, N, Cl) tolerated by aimed catalytic process depends on process type and configuration, catalyst type, catalyst recycle and regeneration process and should be defined separately for each process.

Impurities are removed in the form of e.g. salts of phosphates or sulphates. Level of impurities removed can be optimised to suit aimed catalytic process by e.g. substance dosing and operation conditions.

Present invention also relates to a purified feedstock obtainable by a process according to the invention.

In a further aspect, the invention relates to use of the purified feedstock obtainable by a process according to the invention.

The use may relate to standard operations in e.g. oil refinery industry and may e.g. be catalytic cracking, thermo-catalytic cracking, catalytic hydrotreatment, fluid catalytic cracking, catalytic ketonization, catalytic esterification, catalytic dehydration.

In particular the use of the purified feedstock obtainable by a process according to the invention may relate to thermo-catalytic cracking, catalytic hydrotreatment, fluid catalytic cracking.

Moreover, the invention relates to a method for catalytic cracking, thermo-catalytic cracking, catalytic hydrotreatment, fluid catalytic cracking, catalytic ketonization, catalytic esterification, or catalytic dehydration of a purified feed-stock, wherein the feedstock is obtained by a process according to the invention.

Furthermore, the invention relates to use of a feedstock in a process for purifying a feedstock product, said feedstock comprising any of the following
 a) an iron content (Fe) of more than 1 ppm
 b) a sodium content (Na) of more than 1 ppm
 c) a phosphorous content (P) of more than 20 ppm
and wherein the feedstock is purified by a process according to the present invention

EXAMPLES

The process of the present invention was compared to the performance of degumming with different feedstock and different acid.

Heat Treatment (HT)

Feedstock with phosphoric acid (PA, 85% concentration) and/or water was heated in a 1 liter stirred pressure reactor to desired temperature (220-280° C.), and held for 30-60 min under mixing 500 rpm. The reactor was cooled to ca. 50° C. and opened. Product oil was filtered at 85° C. through 2 μm filter paper or first evaporated in a rotary evaporator before filtration.

The filtered oil was analyzed for impurities.

Degumming (Deg.)

The degumming tests were carried out by performing following steps:
 Feed was preheated to 85° C. when tall oil pitch was used as feed and to 60° C. when oils and fats were used as feed.
 Phosphoric acid (PA, 85% concentration) was added to feed at 85° C. and 60° C., respectively. After acid addition, blend was mixed for 2 minutes by high sheer mixing (8000 rpm) and then 5 minutes slower mixing (500 rpm).
 3 wt-% of pure water was added at 85° C. and 60° C., respectively, when water was added. Mixing was performed for 2 minutes by high sheer mixing (8000 rpm) and 60 minutes with slower mixing (500 rpm)
 Treated blend was centrifuged (batch mode in laboratory) with 4300 rpm for 30 minutes at 85° C. or 60° C., respectively.
 Oil and fat fractions were carefully separated above gums-water phase.
 Separated oil and fat fractions were filtered with Büchner funnel (2 μm, 85° C.).
 The filtered oil was analyzed for impurities.

Example 1—Heat Treatment of Tall Oil Pitch

Two different samples of Tall oil pitch with different level of impurities were tested. TOP (1) contained high levels of impurities and TOP (2) contained lower levels of impurities. The content of impurities in the feeds are shown in Table 1.

Tall oil pitch (TOP), residual bottom fraction from tall oil distillation process, was treated by degumming (85° C., comparative test) and heat treatment (230° C./1 h) according to the process of the present invention. The amounts of phosphoric acid added were 2000 ppm or 4000 ppm for TOP (1) and 750 ppm, 1000 ppm or 2000 ppm for TOP (2). Heat treatment was tested with and without addition of water. The results of treatments are presented in Table 1.

Degumming of TOP (1) (high impurity) resulted in unsatisfactory purification of Na and Fe and oil losses (3-6 wt % in lab scale). Heat treatment with same chemical dosage resulted in significantly better purification result and oil losses 80% lower (ca. 0.5 wt %) than the oil losses of degumming.

Treatment of lower impurity TOP (2) resulted in similar results for degumming and heat treatment, however, the oil losses of degumming (ca. 1.5 wt % in lab scale, upto 18 wt % in pilot continuous operation) are significantly larger than for heat treatment (ca. 0.3-0.5 wt %).

TABLE 1

Treatment of tall oil pitch by degumming (Deg.) and heat treatment (HT).

| Feed | Purification step | Fe (mg/kg) | Na (mg/kg) | Ca (mg/kg) | Mg (mg/kg) | P (mg/kg) |
|---|---|---|---|---|---|---|
| TOP (1) | Feed (water content 0.01 wt %) | 33 | 805 | 64 | 5.4 | 63 |
| | Deg. 2000 ppm PA + 3 wt % water | 9 | 296 | 24 | 1.4 | 122 |
| | 2x Deg. 2000 ppm PA + 3 wt % water | 3.4 | 45 | 5.5 | 0.4 | 90 |
| | Deg. 4000 ppm PA + 3 wt % water | 7 | 69 | 5.4 | 0.6 | 94 |
| | HT 2000 ppm PA + 3 wt % water | 0.3 | 106 | 0.7 | <0.3 | 5 |
| | HT 2000 ppm PA | 17 | 292 | 29 | 3 | 244 |
| | HT 4000 ppm PA + 3 wt % water | <0.1 | 6 | 0.1 | <0.3 | 8 |
| | HT 4000 ppm PA | 0.82 | 11 | 1.5 | <0.3 | 54 |

TABLE 1-continued

Treatment of tall oil pitch by degumming (Deg.) and heat treatment (HT).

| Feed | Purification step | Fe (mg/kg) | Na (mg/kg) | Ca (mg/kg) | Mg (mg/kg) | P (mg/kg) |
|---|---|---|---|---|---|---|
| TOP (2) | Feed (water content 0.14 wt %) | 32 | 383 | 18 | 2.8 | 105 |
| | Deg. 2000 ppm PA + 3 wt % water | 1.3 | 2.4 | 0.4 | <0.3 | 23 |
| | HT 2000 ppm PA + 3 wt % water | 0.2 | 5 | <0.3 | <0.3 | 36 |
| | HT 2000 ppm PA | <0.1 | <1 | <0.3 | <0.3 | 73 |
| | HT 1000 ppm PA | <0.1 | 8 | 0.5 | <0.3 | 17 |
| | HT 750 ppm PA + 1.5% water | <0.1 | 15 | <0.3 | <0.3 | 6 |

Example 2—Heat Treatment of Sludge Palm Oil

Sludge palm oils (SPO) are waste oils collected from water ponds located near palm oil mills. Two different samples of SPO with different levels of impurities were tested, SPO (1) had high level of impurities and SPO (2) had lower level of impurities. SPO (1) was heat treated at 230° C./1 h and SPO (2) at 220° C./1 h. Results for purification treatment of SPOs are presented in Table 2.

Degumming of SPO (1) gave unsatisfactory purification result unless double degumming treatment was performed which resulted in high oil losses (12 wt %). Same and better result in terms of metal content was gained by heat treating the same feed with phosphoric acid addition resulting in significantly lower oil losses (0.8 wt %).

SPO (2) of lower impurity level was purified by lower phosphoric acid dosage than SPO (1). Results show that treatment with addition of acid is required in order to lower the level of Fe and Ca.

TABLE 2

Treatment of sludge palm oil by degumming (Deg.) and heat treatment (HT).

| Feed | Purification step | Fe (mg/kg) | Na (mg/kg) | Ca (mg/kg) | Mg (mg/kg) | P (mg/kg) |
|---|---|---|---|---|---|---|
| SPO (1) | Feed (water content 2.0 wt %) | 194 | 5 | 200 | 12 | 22 |
| | Deg. 2000 ppm PA + 3 wt % water | 57 | 1.2 | 17 | 0.4 | 67 |
| | 2x Deg. 2000 ppm PA + 3 wt % water | 5 | 1.2 | 0.4 | <0.3 | 21 |
| | Deg. 4000 ppm PA + 3 wt % water | 32 | 1.8 | 3.2 | <0.3 | 44 |
| | HT 3 wt % water | 176 | 15 | 201 | 14 | 10 |
| | HT 2000 ppm PA + 3 wt % water | 1.4 | 0.2 | 1.3 | 0.2 | 11 |
| | HT 2000 ppm PA | 7.5 | 1.7 | 14 | 0.8 | 28 |
| SPO (2) | Feed (water content 0.5 wt %) | 45 | 5 | 93 | 6 | 28 |
| | HT, no additions | 48 | 5 | 78 | 7 | 18 |
| | HT 500 ppm PA | 10.5 | 2.4 | 29 | 2.5 | 50 |
| | HT 1000 ppm PA | 1.2 | 0.9 | 6.3 | 0.3 | 54 |
| | HT 2000 ppm PA | 1.6 | <1.0 | 2.7 | 0.5 | 170 |

Example 3—Heat Treatment of Animal Fat

Figure 2:
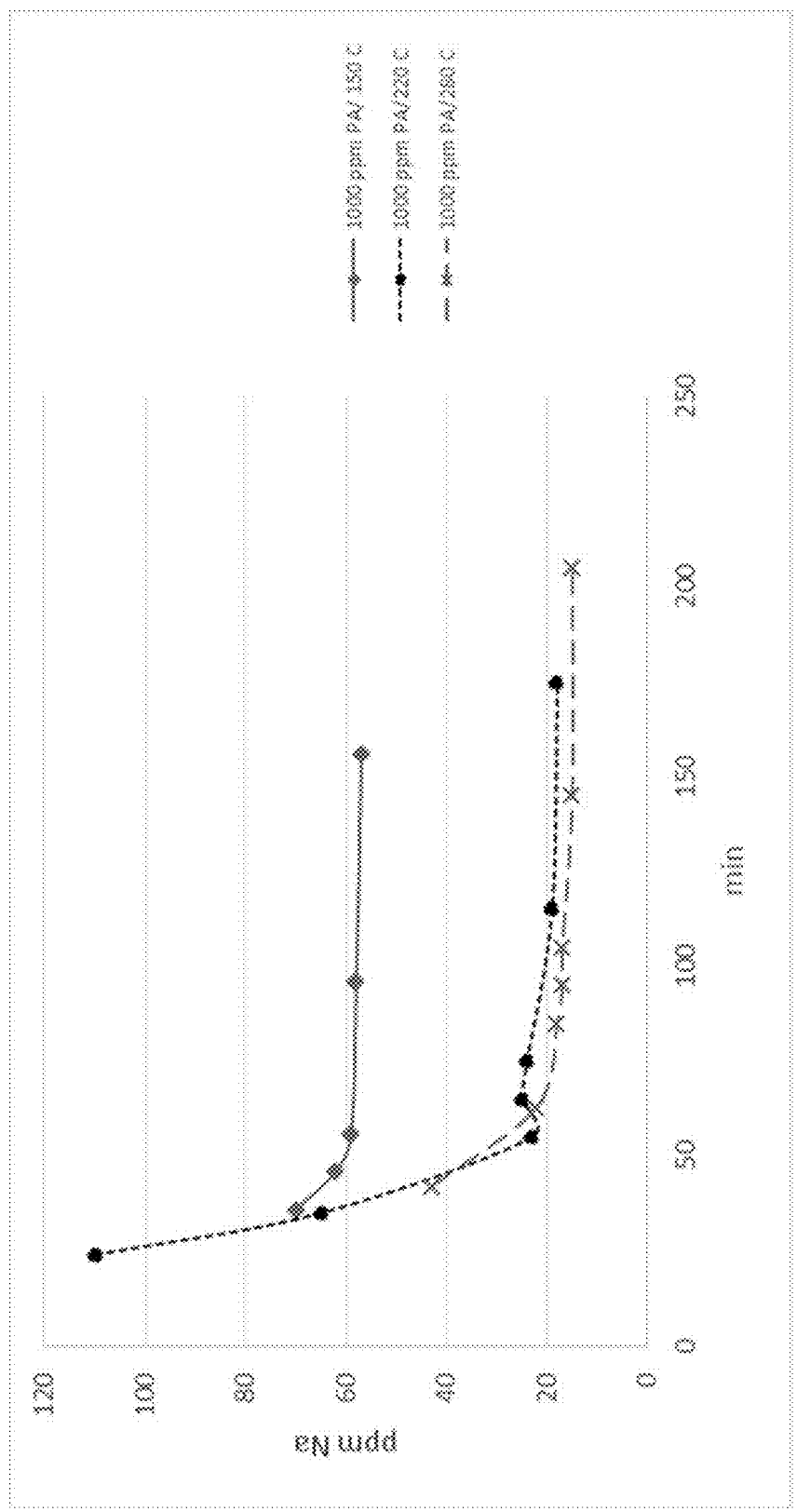
FIG. 2 illustrates the effect of temperature in acid treatment of AF with 1000 ppm PA (0 min=beginning of experiment, 35 min=150° C. reached, 50 min=220° C. reached, 80 min=280° C. reached).
Figure 3:
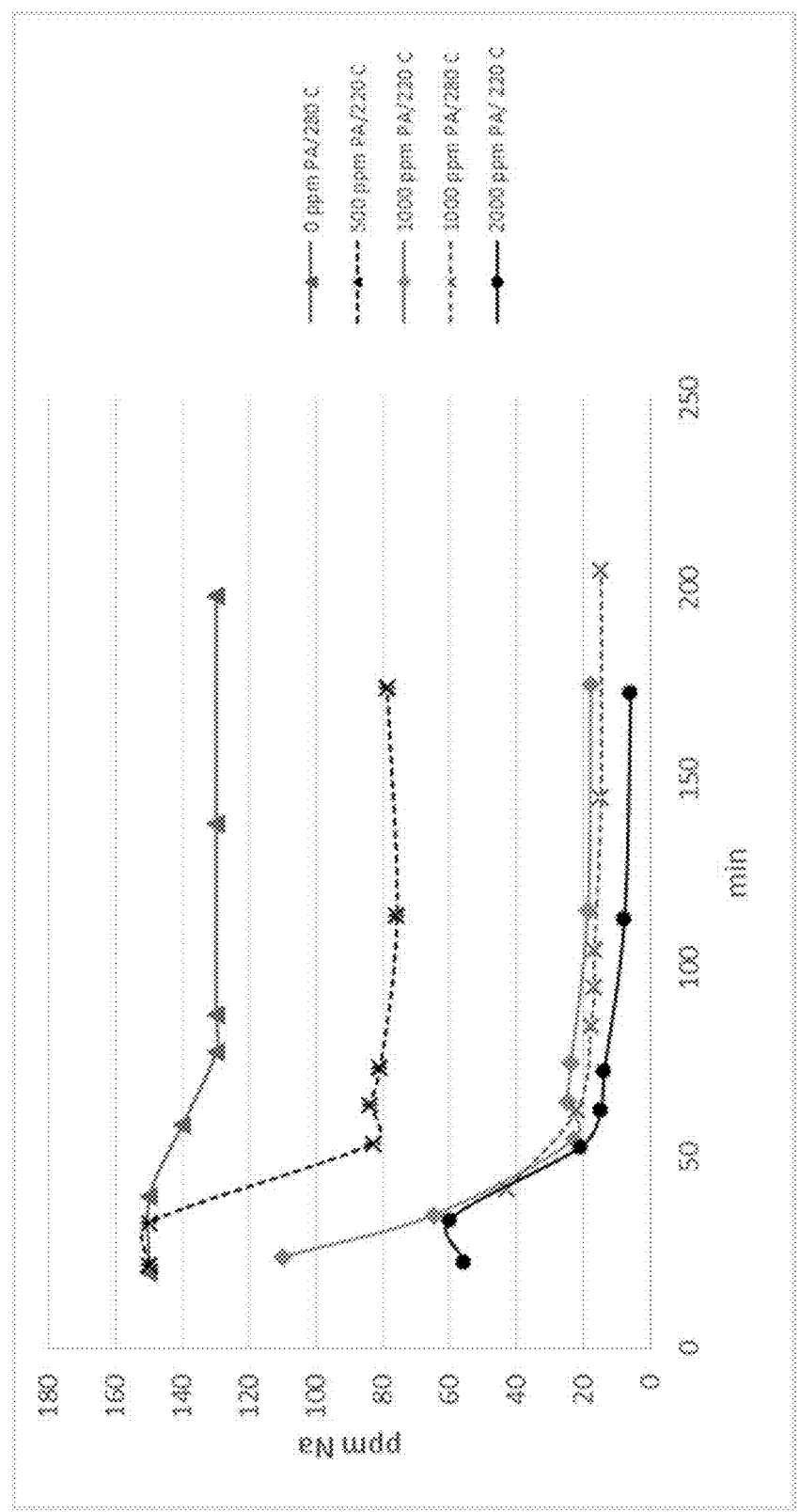
FIG. 3 illustrates the effect of acid dosage at 220° C. and 280° C. as a function of time (0 min=beginning of experiment, 50 min=220° C. reached, 80 min=280° C. reached).

Animal fat was heat treated with different dosage of phosphoric acid and different temperature. The analysis result of filtered samples is presented in Table 3. FIG. 2 presents the level of sodium of filtered samples taken during treatment in a pressure reactor. Table 4 presents the results of heat treatment performed with different acid dosage. FIG. 3 presents the level of sodium of filtered samples taken during treatment in pressure reactor.

These results shows the impact of treatment conditions above 200° C. An optimal dosage of acid should be found to obtain optimal purification

TABLE 3

Treatment of animal fat at different temperature with 1000 ppm PA. Results after heat treatment are for filtered samples after 60 min treatment.

| Purification step | Fe (mg/kg) | Na (mg/kg) | Ca (mg/kg) | Mg (mg/kg) | P (mg/kg) |
|---|---|---|---|---|---|
| Feed (water content 0.15 wt %) | 4 | 160 | 270 | 8.3 | 180 |
| HT 1000 ppm PA, 150 C. | 0.93 | 58 | 0.35 | <0.3 | 38 |
| HT 1000 ppm PA, 220 C. | 0.18 | 19 | <0.3 | <0.3 | 11 |
| HT 1000 ppm PA, 280 C. | <0.1 | 15 | <0.3 | <0.3 | 9.7 |

TABLE 4

Treatment of animal fat at different temperature with 0 ppm, 500 ppm, 1000 ppm and 2000 ppm phosphoric acid addition. Results after heat treatment are for filtered samples after 60 min treatment.

| Purification step | Fe (mg/kg) | Na (mg/kg) | Ca (mg/kg) | Mg (mg/kg) | P (mg/kg) |
|---|---|---|---|---|---|
| Feed (water content 0.15 wt %) | 4 | 160 | 270 | 8.3 | 180 |
| HT 0 ppm PA, 280 C. | 0.45 | 130 | 0.42 | <0.3 | <0.6 |
| HT 500 ppm PA, 220 C. | 0.19 | 76 | 0.45 | <0.3 | 5.7 |
| HT 1000 ppm PA, 220 C. | 0.18 | 19 | <0.3 | <0.3 | 11 |

TABLE 4-continued

Treatment of animal fat at different temperature with
0 ppm, 500 ppm, 1000 ppm and 2000 ppm phosphoric acid
addition. Results after heat treatment are for filtered
samples after 60 min treatment.

| Purification step | Fe (mg/kg) | Na (mg/kg) | Ca (mg/kg) | Mg (mg/kg) | P (mg/kg) |
|---|---|---|---|---|---|
| HT 1000 ppm PA, 280 C. | <0.1 | 15 | <0.3 | <0.3 | 9.7 |
| HT 2000 ppm PA, 220 C. | 0.25 | 8 | <0.3 | <0.3 | 31 |

Example 4—Heat Treatment of Animal Fat with Sulphuric Acid

Animal fat was heat treated with 1000 ppm sulphuric acid (98% concentration) or phosphoric acid (added at 85% concentration) at 250° C./30 min in pressure reactor. The result of filtered samples is presented in Table 5.

Heat treatment of animal fat with addition of acid according to invention resulted in better purity than heat treatment without additions. Sulphuric acid was slightly more effective in enhancing purification of animal fat, however, somewhat more precipitate separated in filtration (0.7 wt % of original feed compared to 0.3 wt % in treatment with phosphoric acid).

TABLE 5

Treatment of animal fat. Results after heat treatment are for filtered samples.

| Purification step | Fe (mg/kg) | Na (mg/kg) | Ca (mg/kg) | Mg (mg/kg) | P (mg/kg) |
|---|---|---|---|---|---|
| Feed (water content 0.15 wt %) | 4 | 160 | 270 | 8.3 | 180 |
| HT, no additions | 0.11 | 120 | 10 | 0.31 | 6.4 |
| HT 1000 ppm phosphoric acid | <0.1 | 34 | 0.4 | <0.3 | 5.9 |
| HT 1000 ppm sulphuric acid | <0.1 | 4.8 | 0.33 | <0.3 | 19 |

In specific embodiments, the invention also relates to the following items:

1. A process for purifying a feedstock, the process comprising the steps of;
   a) providing a feedstock,
   b) adding to the feedstock a substance capable of forming a separate phase with impurities present in the feedstock,
   c) heating the admixture b),
   d) optionally removing water,
   e) removing the separated phase from the heat treated feedstock
to obtain a purified feedstock.

2. The process according to item 1, wherein the feedstock is of fossil or non-fossil origin such as e.g. fats, waxes or oils or any mixtures thereof.

3. The process according to item 1, wherein the feed stock comprises one or more of tall oil pitch or the residual bottom fraction from tall oil distillation processes, animal based oils or fats, vegetable or plant based oil or fat such as e.g. sludge palm oil or used cooking oil, microbial or algae oils, free fatty acids, or any lipids containing phosphorous and/or metals, oils originating from yeast or mould products, oils originating from biomass, rapeseed oil, canola oil, colza oil, tall oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria or any mixtures of said feedstocks.

4. The process according to item 1, wherein the feed stock comprises used or spent lubrication oils, 5. The process according to any of the preceding items, wherein the impurities are e.g. alkali metals or alkali earth metals, phosphorous compounds or iron compounds.

6. The process according to any of the preceding items, wherein the substance capable of forming a separate phase with the impurities present in the feedstock is an acid and/or a chelator.

7. The process according to any of the preceding items, wherein the acid is a non-oxoacid or mixture of non-oxoacids, an inorganic oxoacids or a mixture of inorganic oxoacids.

8. The process according to any of the preceding items, wherein the acid is selected from one or more of phosphoric acid, polyphosphoric acid, metaphosphoric acid, pyrophosphoric acid, peroxomonophosphoric acid, hypophosphoric acid, diphosphoric acid, phosphonic acid, diphosphonic acid, phosphinic acid, sulfuric acid, sulphurous acid, disulfuric acid, peroxomonosulfuric acid, peroxodisulfuric acid, thiosulfuric acid, dithionic acid, disulfurous acid, thiosulfurous acid, dithionous acid, sulfoxylic acid, polythionic acids or any mixtures thereof.

9. The process according to any of the preceding items, wherein the acid is selected from one or more of phosphoric acid, polyphosphoric acid, metaphosphoric acid, pyrophosphoric acid, peroxomonophosphoric acid, hypophosphoric acid, diphosphoric acid, phosphonic acid, diphosphonic acid, phosphinic acid.

10. The process according to any of the preceding items, wherein the acid is selected from one or more of sulfuric acid, sulphurous acid, disulfuric acid, peroxomonosulfuric acid, peroxodisulfuric acid, thiosulfuric acid, dithionic acid, disulfurous acid, thiosulfurous acid, dithionous acid, sulfoxylic acid, polythionic acids.

11. The process according to any of the preceding items, wherein the acid is phosphoric acid.

12. The process according to any of the preceding items, wherein the acid is sulfuric acid.

13. The process according to any of the preceding items, wherein substance capable of forming a separate phase with the impurities present in the feedstock is a chelator or a mixture of chelators 14. The process according to any of the preceding items, wherein the chelator or a mixture of chelators is selected from DTPA (diethylenetriaminepentaacetic acid), EDTA (ethylenediaminetetraacetic acid), NTA (nitrilotriacetic acid) or any mixtures thereof.

15. The process according to any of the preceding items wherein the amount of acid is e.g. about 50 ppm to about 100000 ppm, such as e.g. 500 ppm to about 10000 ppm, such as e.g. about 500 ppm to about 4000 ppm, such as e.g. about 1000 ppm to about 5000 ppm, such as e.g. about 2000 ppm to about 4000 ppm, such as e.g. about 50 ppm, about 1000 ppm, about 2000 ppm, about 3000 ppm, about 4000 ppm, about 5000 ppm, about 6000 ppm, about 7000 ppm, about 8000 ppm, 9000 ppm or about 10000 ppm.

16. The process according to any of the preceding items, wherein the heating temperature in step c) is about 150° C. to about 350° C., such as e.g. about 200° C. to about 280°

C., such as e.g. about 200° C., about 230° C., about 260° C., about 280° C. or about 290° C.

17. The process according to any of the preceding items, wherein the heating in step c) is maintained in the mixture for about 1 minute to about 420 minutes, such as e.g. about 10 minutes to about 180 minutes, such as e.g. about 5 minutes to about 60 minutes, such as e.g. about 10 minutes to about 60 minutes, such as about 20 minutes, about 30 minutes, about 40 minutes, about 50 minutes or about 60 minutes.

18. The process according to any of the preceding items, wherein the heating in step c) is maintained in the mixture for about 5 minutes to about 60 minutes.

19. The process according to any of the preceding items, wherein the water in step d) is removed by flash evaporation or any suitable vapour-liquid separation or removed by physical separation wherein the water layer is separated.

20. The process according to any of the preceding items, wherein the water is optionally removed before removal of the separate phase formed in step e).

21. The process according to any of the preceding items, wherein in step e) the separate phase formed in the feedstock is removed by filtration, centrifugation or gravitational sedimentation, bleaching, degumming, water washing, filtering or a combination thereof.

23. The process according to any of the preceding items, wherein the resulting mixture after steps c) or d) is reduced volume by e.g. evaporation or flashing prior to filtration in step e).

24. The process according to any of the preceding items, wherein step a) is optionally preceded by a step wherein water is removed.

25. A purified feedstock obtainable by a process according to any of items 1-24.

26. Use of a purified feedstock obtainable by a process according to any of items 1-24 for catalytic cracking, thermo-catalytic cracking, catalytic hydrotreatment, fluid catalytic cracking, catalytic ketonization, catalytic esterification, or catalytic dehydration.

27. A method for catalytic cracking, thermo-catalytic cracking, catalytic hydrotreatment, fluid catalytic cracking, catalytic ketonization, catalytic esterification, or catalytic dehydration of a purified feed-stock, wherein the feedstock is obtained by a process according to any of items 1-24.

28. Use of a feedstock in a process for purifying a feedstock product for catalytic hydrotreatment, thermo-catalytic cracking, said feedstock comprising any of the following a) an iron content (Fe) of more than 1 ppm
b) a sodium content (Na) of more than 1 ppm
c) a phosphorous content (P) of more than 20 ppm.

The invention claimed is:

1. A process for purifying a feedstock, the process comprising:
   a) providing a feedstock containing impurities, wherein the feedstock comprises:
   one or more of animal fat, tall oil pitch, sludge palm oil or used cooking oil or any combinations thereof;
   b) adding to the feedstock phosphoric acid or sulfuric acid forming an admixture, and adjusting a water content of the admixture as a whole to about 0.05 wt % to about 10 wt %;
   c) heating the admixture to a temperature of 200° C. to 280° C.;
   d) optionally removing water; and
   e) removing a separate phase containing impurities from the feedstock from the heated admixture to obtain a purified feedstock.

2. The process according to claim 1, comprising adjusting the water content of the admixture as a whole to about 0.1 wt % to about 5 wt %.

3. The process according to claim 1, wherein the feedstock further comprises:
   one or more of a residual bottom fraction from tall oil distillation processes, animal based oils, vegetable or plant based oils or fats, microbial or algae oils, free fatty acids, or any lipids containing phosphorous and/or metals, oils originating from yeast or mould products, oils originating from biomass, rapeseed oil, canola oil, colza oil, tall oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, or biological starting materials produced by microbes, algae or bacteria or any mixtures of said feedstocks.

4. The process according to claim 1, wherein the feedstock further comprises:
   used or spent lubrication oils.

5. The process according to claim 1, wherein the impurities are alkali metals or alkali earth metals, phosphorous compounds or iron compounds.

6. The process according to claim 1, comprising adding a chelator to the admixture in step b).

7. The process according to claim 1, wherein the acid is phosphoric acid.

8. The process according to claim 1, wherein the acid is sulfuric acid.

9. The process according to claim 1 wherein an amount of acid is selected to be within a range of about 50 ppm to about 100000 ppm, 500 ppm to about 10000 ppm, about 500 ppm to about 4000 ppm, about 1000 ppm to about 5000 ppm, about 2000 ppm to about 4000 ppm, about 50 ppm, about 1000 ppm, about 2000 ppm, about 3000 ppm, about 4000 ppm, about 5000 ppm, about 6000 ppm, about 7000 ppm, about 8000 ppm, 9000 ppm or about 10000 ppm.

10. The process according to claim 1, wherein the heating temperature in step c) is selected to be about 200° C., about 230° C., about 260° C., or about 280° C.

11. The process according to claim 1, comprising:
   maintaining the heating in step c) in the admixture for about 1 minute to about 420 minutes, about 10 minutes to about 180 minutes, about 5 minutes to about 60 minutes, about 10 minutes to about 60 minutes, about 20 minutes, about 30 minutes, about 40 minutes, about 50 minutes or about 60 minutes.

12. The process according to claim 1, comprising:
   maintaining the heating in step c) in the admixture for about 5 minutes to about 60 minutes.

13. The process according to claim 1, comprising:
   removing the water in step d), wherein the removing is by flash evaporation or any suitable vapour-liquid separation, or by physical separation wherein a water layer is separated.

14. The process according to claim 1, comprising:
   removing the water in step d), wherein removing the water is before removal of the separate phase in step e).

15. The process according to claim 1, comprising:
removing in step e) the separate phase by filtration, centrifugation or gravitational sedimentation, bleaching, degumming, water washing, filtering or a combination thereof.

16. The process according to claim 1, comprising:
reducing the admixture after steps c) or d) in volume by evaporation or flashing prior to the removing in step e).

17. The process according to claim 1, comprising removing water from the feedstock containing impurities before step a).

18. The process according to claim 1,
wherein the feedstock containing impurities contains any of the following:
a) an iron content (Fe) of more than 1 ppm;
b) a sodium content (Na) of more than 1 ppm; or
c) a phosphorous content (P) of more than 20 ppm.

* * * * *